United States Patent Office 2,862,971
Patented Dec. 2, 1958

2,862,971

ARYL AND ARALKYL BISTRIPHENYLPHOSPHONIUM COMPOUNDS AND PROCESSES

Lawrence E. Thielen, Chicago, and Clinton A. Dornfeld, Glenview, Ill., assignors to G. D. Searle & Co., Chicago, Ill., a corporation of Illinois No Drawing. Application September 26, 1955
Serial No. 536,732

6 Claims. (Cl. 260—606.5)

This invention relates to aryl and aralkyl bistriphenylphosphonium compounds and processes for the manufacture thereof. More particularly, this invention relates to compounds of the formula $$(C_6H_5)_3P^+ - Z - P^+(C_6H_5)_3 \quad 2X^-$$

wherein Z is a bivalent, aromatic, hydrocarbon radical selected from the group consisting of

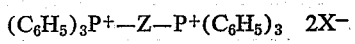

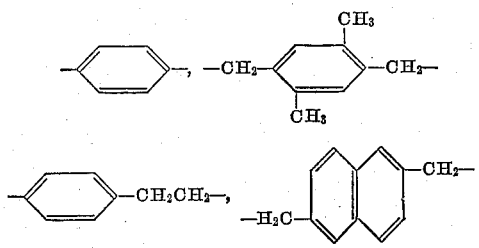

and

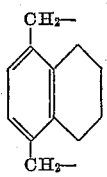

radicals; and X is bromine or chlorine.

The subject compounds are useful because of their distinctive pharmacological activity. Especially, these compounds manifest the property of blocking both sympathetic and parasympathetic ganglia of the autonomic nervous system, for prolonged periods of time, and without the collateral hypotensive effect which frequently complicates the therapeutic application of phosphonium compounds generally.

The claimed compositions are quite soluble in water, as also in aqueous solutions of alcohols and other water-miscible organic solvents. They may be administered in solid form as tablets or capsules; dissolved in aqueous media, they may be given parenterally.

The compounds to which this invention relates may be prepared by the following procedure: Triphenylphosphine is reacted with a dibromo intermediate of the formula

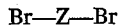
Br—Z—Br

Z being defined as above, to give the bromides of the present discovery. The reaction is carried out at temperatures of the order of 125° to 225° centigrade, over periods of time ranging from as little as less than 1 hour to as long as approximately 4 days. If desired, a solvent may be used, preferably a high-boiling, inert, polar, organic solvent—for example, a glycol ether such as diethylene glycol diethyl ether, or a ketonic solvent such as 2,4-pentanedione. Where the selected operating temperatures require working under pressure, the reactants are housed in a sealed vessel. The bisbromo compounds thus prepared are converted to the corresponding chlorides of this invention by heating with silver chloride, preferably in aqueous medium.

The dibromo intermediates are commercially available in part, the rest being prepared from the corresponding dichloro compounds by interaction thereof with sodium acetate in acetic acid solution and subsequent saturation with gaseous hydrogen bromide, or—alternatively—by treatment of the dichloro compounds with N-bromosuccinimide. An exception to this means of preparation is the method of making 4-bromo-1-(β-bromoethyl)-benzene, whereby p-bromophenethyl alcohol is converted to the desired dibromo intermediate by interaction with phosphorus tribromide.

The following examples describe in detail certain of the compounds illustrative of the present invention, and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury, and relative amounts of materials in parts by weight, except as otherwise noted.

Example 1

*Benzene-1,4-bis(triphenylphosphonium bromide).*—A mixture of 35 parts of triphenylphosphine and 10 parts of 1,4-dibromobenzene is heated at 200° C. for 90 hours in an atmosphere of nitrogen, following which it is cooled and crystallized by trituration with anhydrous ether. The white precipitate thus obtained is recovered on a filter, washed thereon with ether, and further purified by extraction with a very small quantity of acetone. The pure white product, readily soluble in water, does not melt below 300° C. Benzene-1,4-bis(triphenylphosphonium bromide) as the formula

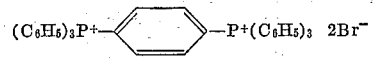

Example 2

*Benzene-1,4-bis(triphenylphosphonium chloride).*—A solution of 76 parts of the bisbromo compound of the preceding Example 1 in 8000 parts of water is mixed with 29 parts of silver chloride; and this mixture is heated at reflux temperatures for 2 hours, vigorous agitation being effected throughout. The benzene-1,4-bis-(triphenylphosphonium chloride) thus produced has the formula

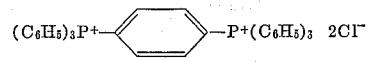

Example 3

A. *1-bromo-4-(β-bromoethyl)benzene.*—To a solution of 54 parts of 4-bromophenethyl alcohol in 160 parts of carbon tetrachloride at reflux temperatures is added, during 10–15 minutes, 29 parts of phosphorus tribromide. Copious evolution of hydrogen bromide results. Reflux with agitation is continued approximately 20 minutes after addition of the potassium tribromide is completed. The reaction mixture is then washed, successively, with 10% aqueous sodium carbonate and with water, the washes, in turn, being extracted with ether. The ether extract is washed, successively, with 10% aqueous sodium carbonate and with water, whereupon it is combined with the washed reaction mixture and the resultant solution dried over anhydrous sodium sulfate. Solvent is stripped by evaporation, and the residue distilled to give a colorless oil boiling at 143–150° C. under 7 mm.

pressure. The product thus obtained is 1-bromo-4-(β-bromoethyl)benzene.

B. *Ethylbenzene - 4,β - bis(triphenylphosphonium bromide).*—A mixture of 10 parts of triphenylphosphine and 5 parts of 1-bromo-4-(β-bromoethyl)benzene in 14 parts of diethylene glycol diethyl ether is heated at the boiling point in an atmosphere of nitrogen for approximately 72 hours. A yellow oil forms in process. The reaction mixture is cooled and poured into ether. Ether is decanted and the taffy-like residue is then triturated with acetone. A white powder is produced which, filtered out and washed on the filter with additional acetone, is further purified by chromatographing on silica gel using chloroform and ethyl alcohol as developing solvents. The ethylbenzene-4,β - bis(triphenylphosphonium bromide) thus obtained melts at 207–209° C. It has the formula

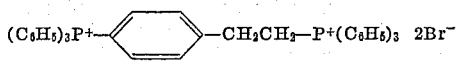

*Example 4*

A. *α¹,α⁴-Dibromodurene.*—A mixture of 21 parts of α¹,α⁴-dichlorodurene—obtainable by the method described at page 69, Organic Reactions, volume 1, John Wiley & Sons, 1942—60 parts of sodium acetate, and 210 parts of glacial acetic acid is heated, with agitation, for 4 hours at reflux temperatures. The reaction mixture is then saturated during 10 minutes with anhydrous hydrogen bromide, following which hydrogen bromide is bubbled through the mixture for an additional 10 minutes, and the reactants then allowed to cool to room temperatures overnight. The mixture is poured into water, precipitating a solid which, crystallized from ether, melts at approximately 160–160.5° C. The product thus obtained is α¹,α⁴-dibromodurene.

B. *Durene - α¹,α⁴ - bis(triphenylphosphonium bromide).*—A mixture of 37 parts of triphenylphosphine, 20 parts of α¹,α⁴-dibromodurene, and 97 parts of 2,4-pentanedione is heated at the boiling point in an atmosphere of nitrogen for 45 minutes. A white precipitate forms almost immediately, the reaction solvent becoming dark green in process. The reactants are cooled and poured into anhydrous ether. The ether is decanted, and the residue is washed again and again with anhydrous ether until the washed solutions become substantially colorless. The light green powder thus obtained is further purified by trituration with acetone. A very pale cream-colored, almost white, material results, which does not melt below 300° C. This product is durene-α¹,α⁴-bis(triphenylphosphonium bromide) of the formula

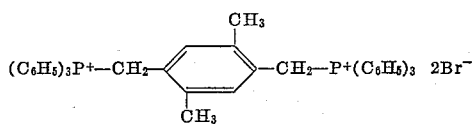

*Example 5*

*2,6-dimethylnaphthalene - α,α'-bis(triphenylphosphonium bromide).*—A mixture of 17 parts of triphenylphosphine, 10 parts of 2,6-di(bromoethyl)naphthalene—obtainable by the method of Funke and Engeler, Bulletin de la Societe Chimique de France, 1950, 340—and 39 parts of 2,4-pentanedione is maintained at the boiling point under an atmosphere of nitrogen for approximately 45 minutes. A copious precipitate is thrown down. The precipitate is recovered by filtration and washed on the filter with a little acetone. The product, pale yellow in color at this point, is next washed with anhydrous ethyl alcohol and then further purified by trituration with warm acetone. The acetone is removed by filtration, leaving a very pale yellow residue which fails to melt below 300° C. The product thus obtained, only slightly soluble in water, is 2,6-dimethylnaphthalene-α,α'-bis(triphenylphosphonium bromide) having the formula

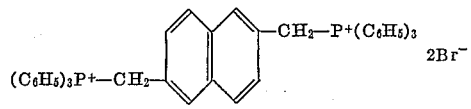

*Example 6*

A. *5,8-di(bromomethyl) - 1,2,3,4 - tetrahydronaphthalene.*—A mixture of 10 parts of 5,8-di(chloromethyl)-1,2,3,4-tetrahydronaphthalene—preparable by the method of G. M. Badger et al., Journal of the Chemical Society, 1947, 1432—30 parts of sodium acetate, and 210 parts of glacial acetic acid is heated to boiling and maintained thereat overnight. During the last 20 minutes of the heating period, hydrogen bromide gas is bubbled through the reaction mixture; and the flow of gas is continued while the reactants are cooled to room temperature. The reaction mixture is then poured into a generous quantity of cold water, precipitating a solid which, crystallized from anhydrous ether, melts at 141–142° C. This material is 5,8-di(bromomethyl) - 1,2,3,4 - tetrahydronaphthalene.

B. *5,8-dimethyl-1,2,3,4-tetrahydronaphthalene-α,α'-bis-(triphenylphosphonium bromide).*—A mixture of 4 parts of 5,8-di(bromomethyl)-1,2,3,4-tetrahydronaphthalene, 7 parts of triphenylphosphine, and 16 parts of 2,4-pentanedione is heated at reflux temperatures under an atmosphere of nitrogen for 3 hours. The reactants are cooled and let stand at room temperatures. A precipitate forms. Anhydrous ether is added, and the precipitate is reduced to a powder by trituration. The precipitate is filtered off and further purified by trituration twice more with anhydrous ether. The white powder which results is 5,8-dimethyl-1,2,3,4-tetrahydronaphthalene - α,α' - bis - (triphenylphosphonium bromide), which does not melt below 300° C. and has the formula

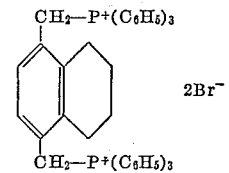

What is claimed is:
1. A compound of the formula

R₃P⁺—Z—P⁺R₃   2X⁻ wherein R is a phenyl radical; Z is a bivalent, aromatic, hydrocarbon radical selected from the group consisting of

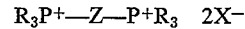

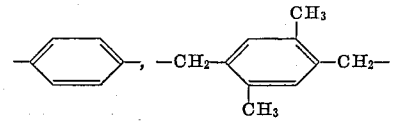

and

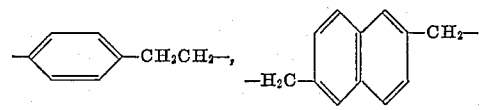

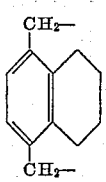

radicals; and X is halogen of atomic number greater than 9 and less than 53.
2. Benzene-1,4-bis(triphenylphosphonium bromide).
3. Durene-α¹,α⁴-bis(triphenylphosphonium bromide).

4. 5,8-dimethyl-1,2,3,4 - tetrahydronaphthalene-α,α'-bis-(triphenylphosphonium bromide).

5. Ethylbenzene-4,β - bis(triphenylphosphonium bromide).

6. 2,6-dimethylnaphthalene - α,α' - bis(triphenylphosphonium bromide).

References Cited in the file of this patent

UNITED STATES PATENTS 1,921,364  Lommel et al. _____ Aug. 8, 1933

OTHER REFERENCES

Ginzel: Chem. Abs. 47 col. 4496 c–s.
Ginzel: Chem. Abs. 48 col. 8951 e–h.